A. B. WALLEM.
LIQUID MEASURING APPARATUS.
APPLICATION FILED SEPT. 5, 1914.

1,205,294.

Patented Nov. 21, 1916.
2 SHEETS—SHEET 1.

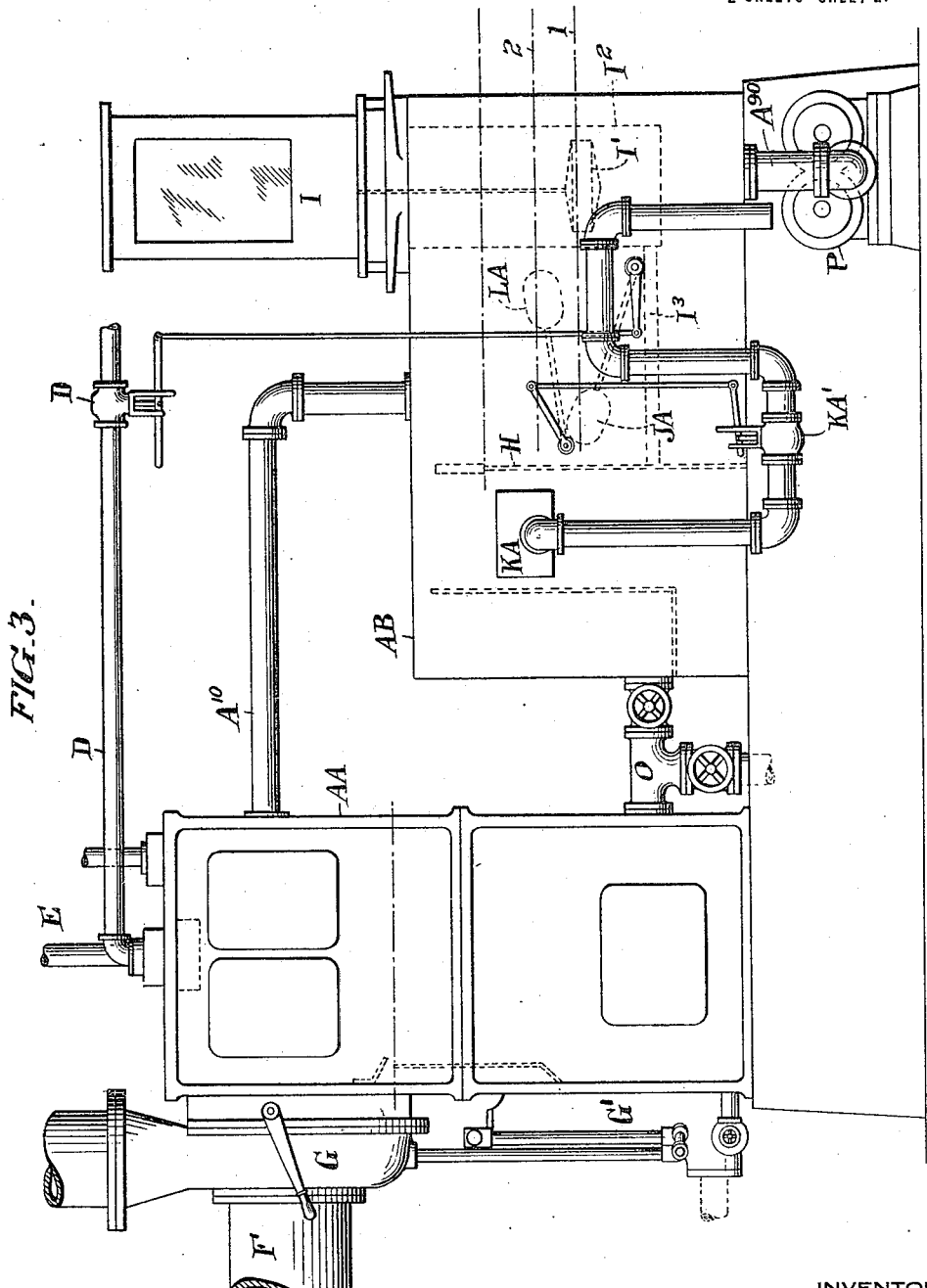

UNITED STATES PATENT OFFICE.

AXEL B. WALLEM, OF CYNWYD, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS IN SAID PHILADELPHIA UNDER THE FIRM-NAME OF HARRISON SAFETY BOILER WORKS.

LIQUID-MEASURING APPARATUS.

1,205,294.  Specification of Letters Patent. Patented Nov. 21, 1916.

Application filed September 5, 1914. Serial No. 860,433.

*To all whom it may concern:*

Be it known that I, AXEL B. WALLEM, a citizen of the United States of America, residing in Cynwyd, in the county of Montgomery, in the State of Pennsylvania, have invented certain new and useful Improvements in Liquid-Measuring Apparatus, of which the following is a true and exact description, reference being had to the accompanying drawings, which form a part thereof.

My present invention relates to liquid measuring apparatus of the type in which the quantity rate of flow of a liquid is determined from the variations in the accumulation of liquid on the supply side of a weir over which the liquid to be measured flows.

My present invention was devised primarily with the object in view of providing simple and effective means for avoiding a difficulty which has arisen in the operation of weir measuring apparatus heretofore employed, from a continued influx of liquid into the weir chamber when the normal discharge from the weir chamber is closed. In practice this continued influx has sometimes been due to leaky valves by which the supply of water to the weir chamber is controlled in whole or in part, but is usually due to heater returns and other drains discharging into the weir chamber, and which it is not practically desirable to cut off when the normal discharge is entirely stopped.

The various features of novelty characterizing my invention are pointed out with particularity in the claims annexed to and forming a part of this specification. For a better understanding of the invention, however, and of the advantages possessed by it, reference should be had to the accompanying drawings and descriptive matter, in which I have illustrated and described forms in which my invention may be embodied.

Figure 1:
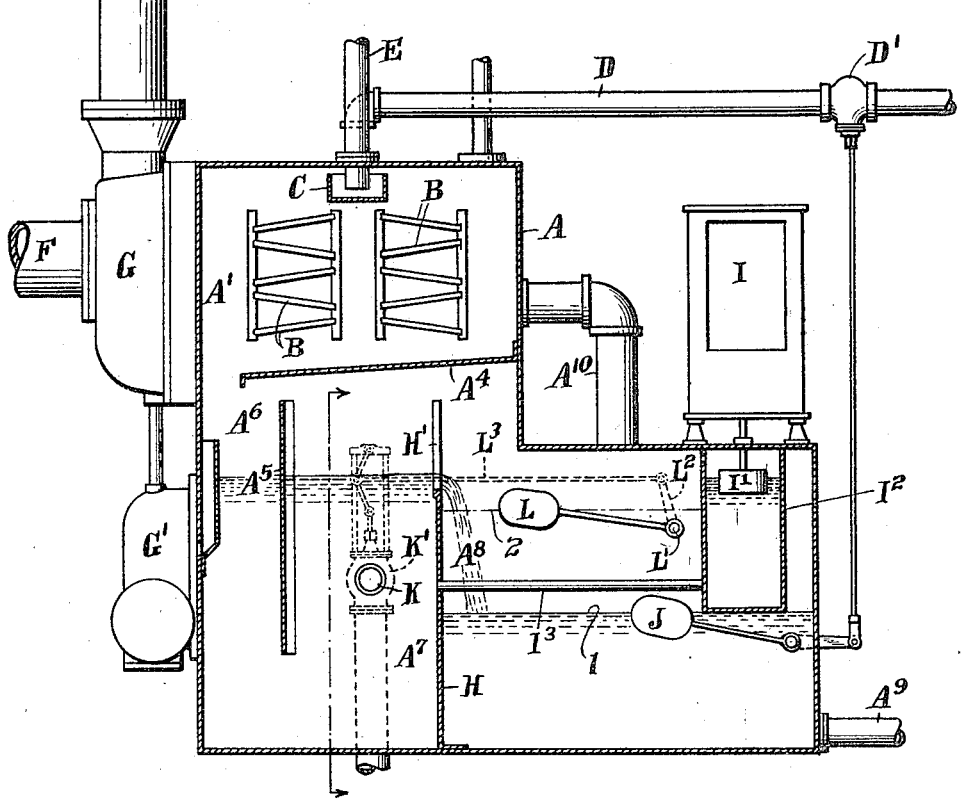
Figure 2:
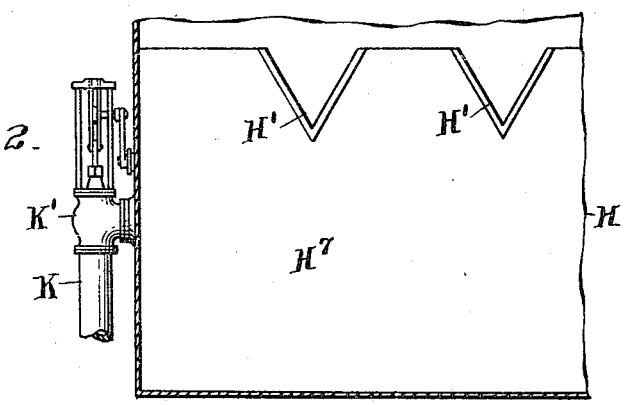

Of the drawings: Figure 1 is a sectional elevation of apparatus embodying one form of my invention; Fig. 2 is a partial section taken on the line 2—2 of Fig. 1, and Fig. 3 is an elevation of a modified form of apparatus embodying my invention.

In the apparatus shown in the drawings, and referring first to Figs. 1 and 2, A represents the tank or inclosing housing of a combined open feed water heater and weir measuring apparatus for measuring the liquid passing out of the heater. As shown, the housing A incloses an upper heating chamber $A'$ in which are mounted the usual splash trays B onto which water falls from the overflow trough C. Makeup water is supplied to the trough C through the pipe D and the water of condensation or "returns" from heating coils or like drainage is conveyed to the trough C through the pipe E. Exhaust steam for heating the water in the chamber $A'$ is supplied to the latter through the pipe F and the usual oil separator G, the drip from which is passed through and discharged by a trap $G'$.

Partitions $A^4$ and $A^5$ with a steam equalizing passage or passages $A^6$ between them, separate the heating chamber $A'$ from the weir chamber located in the lower portion of the casing A. The weir chamber is divided into an inlet or supply compartment $A^7$, and an outlet compartment $A^8$ by a partition H, which is formed in its upper edge with the usual V-notch or V-notches $H'$ through which the water overflows from the compartment $A^7$ to the compartment $A^8$.

$A^9$ represents the service discharge connection leading from the outlet chamber $A^8$ to a boiler feed pump or other place or apparatus for utilizing or disposing of the water passing through the heater and over the weir in normal operation.

I represents an indicating or recording mechanism employed for furnishing an indication or a record, or both, of the quantity of liquid flowing over the weir from the corresponding variations in the height of liquid level in the compartment $A^7$. As shown, the actuating member of the mechanism I is a float $I'$ working in a chamber $I^2$ located within the compartment $A^8$ but having its interior connected to the compartment $A^7$ by a pipe $I^3$.

$A^{10}$ represents a pressure equalizing pipe connecting the steam spaces of the heating and weir chambers.

Normally it is intended to maintain a height of liquid level in the outlet compartment $A^8$ of the weir tank which does not vary much from the level indicated by the line 1. This is brought about through the float J, which is connected to and operates the valve D' in the makeup supply pipe D, and opens and closes the latter as the water level in the compartment $A^8$ falls below or rises to the level of the line 1.

In so far as already described the apparatus disclosed does not differ from that which is well known, and has been in extensive use. With such apparatus difficulty has arisen from the fact that when the normal discharge passage $A^9$ is closed, so that no measured water is being withdrawn from the apparatus, there may be an influx of water into the apparatus, due either to leakage by the valve D', or to the comparatively slow influx of heating "returns" through the pipe E. The effect of this influx of liquid has been to flood the weir chamber, and to raise the water level therein to a height such that the measuring apparatus I, shows a high rate of flow through the measuring chamber when, in point of fact, no liquid is being withdrawn out of the apparatus at all. To overcome this difficulty, I provide a waste connection K, opening from the inlet compartment of the weir chamber at any suitable level below the lowermost level of flow over the weir. This waste passage K is normally closed by the valve K', but the latter is automatically opened whenever the liquid level in the outlet compartment $A^8$ rises to a predetermined height above the level of the line 1. The means for automatically shifting the valve as the liquid level rises to and falls below the line 2 comprises a float L carried by a rock shaft L', which, externally of the casing of the tank A, has an arm $L^2$ connected by a link $L^3$ to the toggle operating provisions of the valve K'. With this arrangement, the maximum height of water level in the compartment $A^8$ is that of the line 2 at which the float L opens the valve K'. When the valve K' is opened the liquid level in the inlet chamber $A^7$ of the weir chamber falls to the level at which the waste passage K is connected to the chamber $A^7$. The apparatus thus absolutely prevents all possibility of a false indication or record by the measuring apparatus I resulting from the influx of water into the apparatus through the pipe E or through the pipe D with any ordinary leakage past the valve D' when the outlet $A^9$ is closed. In practice, the amount of liquid thus entering the apparatus when the normal outlet $A^9$ is closed, as it may be for hours in the night time, is ordinarily very small in comparison with the amount of liquid passing through the apparatus in normal operation. On account of the comparatively small amount of this liquid, the liquid discharged through the escape connection K may be wasted, though, of course, it is possible to provide for its discharge into a suitable reservoir.

In the slightly modified form of apparatus in which my invention is employed, as shown in Fig. 3, the heater tank AA is separate from the weir tank AB, though the steam spaces of the two tanks are connected by a pressure equalizing pipe $A^{10}$. Water flows in normal operation from the tank AA into the weir tank AB through the valved connection O. The heater tank AA is provided with connections and appurtenances E, D, F, G and G', as in Fig. 1. The flow of water to the heater AA through the main supply pipe D is regulated by a valve D' which is controlled by a float JA, as the valve D' of Fig. 1 is controlled by the float J. The flow of water through the escape connection KA leading from the compartment of the weir tank at the inlet side of the weir carrying partition H, is controlled by a valve KA' and float LA, as the valve K' of Figs. 1 and 2 is controlled by the float L. In the apparatus shown in Fig. 3 water is normally withdrawn from the outlet compartment of the weir tank through the connection $A^{90}$ by the boiler feed pump P. It will be understood, of course, that provisions may be made, as shown in Fig. 3, for trapping the normally closed escape passage from the inlet compartment of the weir, so that when the valve KA' is open, steam cannot blow out of, and air cannot be sucked into the weir chamber through the escape connection KA.

While the principal use of the invention at the present time is in connection with weir measuring apparatus for measuring the water delivered from open feed water heaters, it is apparent that the invention is adapted for general use wherever it is desired to prevent an objectionable accumulation of liquid in a chamber or conduit in which a measuring weir is located; and it will be apparent to those skilled in the art that changes may be made in the forms of apparatus disclosed without departing from the spirit of my invention, and that under some conditions certain features of my invention may be used without a corresponding use of other features.

Having now described my invention, what I claim as new and desire to secure by Letters Patent, is:

1. In liquid measuring apparatus, the combination with a weir chamber having inlet and outlet compartments, a weir between them, a liquid outlet from the outlet compartment, and means for supplying liquid to the inlet compartment, of a normally closed escape passage leading from the inlet compartment at a level below the lowermost level of flow over the weir, and means responsive to the height of liquid on the outlet side of the weir for opening and closing said escape passage as the last mentioned level rises to and falls below a predetermined height.

2. In a liquid measuring apparatus, the combination with a weir chamber having inlet and outlet compartments, a weir between said compartments, two liquid supply connections to said inlet compartment, and a liquid outlet from said outlet compartment, of a normally closed escape passage leading from said inlet compartment at a level below the lowermost level of flow over the weir, means responsive to the height of liquid on the outlet side of the weir for opening and closing said escape passage as the last mentioned level rises to, and falls below a predetermined height, and means responsive to the said height of liquid for opening and closing one of said liquid supply connections as said level rises to, and falls below a predetermined height less than the first mentioned height.

AXEL B. WALLEM.

Witnesses:
ROBERT G. CLIFTON,
J. W. GAMBLE.

Copies of this patent may be obtained for five cents each, by addressing the "Commissioner of Patents, Washington, D. C."